UNITED STATES PATENT OFFICE.

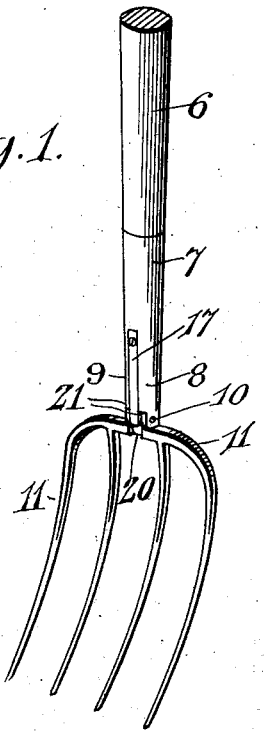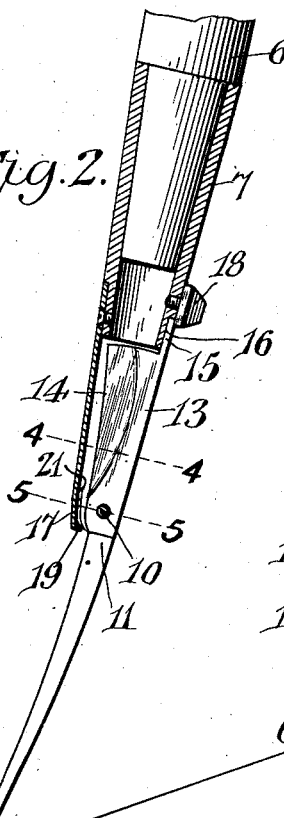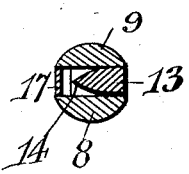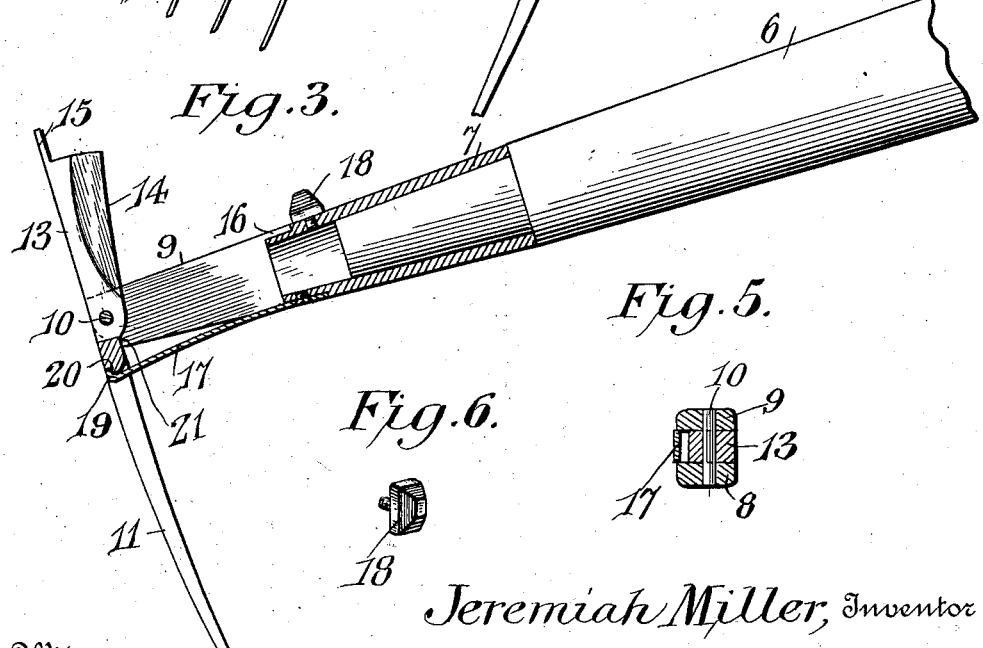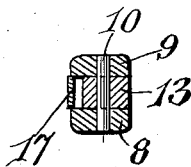

JEREMIAH MILLER, OF TURTLE CREEK, WEST VIRGINIA, ASSIGNOR OF TWO-THIRDS TO JACOB DOW PERRY, ANTHONY DAVID LAWSON, AND CHARLES RANDOLPH MITCHELL, ALL OF DANVILLE, WEST VIRGINIA.

COMBINED FORK AND RAKE.

1,022,962.     Specification of Letters Patent.     Patented Apr. 9, 1912.

Application filed September 18, 1911. Serial No. 650,055.

*To all whom it may concern:*

Be it known that I, JEREMIAH MILLER, a citizen of the United States, residing at Turtle Creek, in the county of Boone and State of West Virginia, have invented a new and useful Combined Fork and Rake, of which the following is a specification.

This invention relates to garden tools, and has for its principal object to provide a hand tool of this class, which is adapted to be adjusted and used as a combined pitchfork, rake and brush cutting device.

Another object is to provide a tool of this class constructed in such a manner that when it is used as a fork, the cutting blade will be folded within the tool out of the way, and when employed as a rake, the cutting blade will project outwardly in alinement with the tines of the rake and provide a ready means for cutting small roots, brush and the like.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of my improved implement ready for use as a fork, the handle being cut off and the parts being shown on a smaller scale than in the remaining figures. Fig. 2 is a longitudinal sectional view with the implement shown in the same position as Fig. 1. Fig. 3 is a side view, partly in section with the fork in position to be used as a rake and the knife open. Fig. 4 is a cross section on the line 4—4 of Fig. 2. Fig. 5 is a similar section on the line 5—5 of Fig. 2. Fig. 6 is a view of the turn button.

Referring to the drawings, in which like numerals of reference indicate similar parts in the several views, 6 is a handle upon the front or outer end of which is secured a hollow outwardly tapered ferrule 7. The outer end of the ferrule 7 is bifurcated or slotted longitudinally and centrally, the slot extending from the outer end of the ferrule inwardly to approximately one half the length of the ferrule, thus defining two parallel arms 8 and 9, one on either side thereof.

Pivotally mounted between the outer ends of the parallel arms 8 and 9, as by the pivot pin 10, is the fork 11, having the usual tines, and a substantially oblong blade arm 13 extends from the head of the fork at or about the center thereof. The outer edge of the arm 13 is substantially the same width and length as the slot between the parallel arms 8 and 9, and is approximately in a longitudinal plane with the outer edge of the head of the fork, while the inner edge projects beyond the inner edge of the head and is provided with a sharpened knife edge 14. The pivot pin 10 extends through the ends of the arms 8 and 9 and through the arm 13 just in rear of the head of the fork 11.

The outer edge of the arm or blade 13 is provided at its end with a flat integral extension or lip 15, adapted to fit within a recess 16 provided in the outer side of the ferrule between the arms 8 and 9, and limit the inward movement of the arm 13, when the device is to be used as a fork, as shown in Figs. 1 and 2, and is held in this position by the body of a turn button 18 rotatably mounted on the ferrule adjacent the recess 16. The body of the button 18 is preferably oblong so that the button may be turned and not come in contact with the extension or lip 15 when closing the blade in the ferrule.

Located on the opposite side of the ferrule from the recess 16 and seated in a recess extending longitudinally of the ferrule, and between the parallel arms 8 and 9, is a flat spring catch 17 which closes the space between the arms 8 and 9 and extends approximately to the point of juncture of the arm 13 and the head of the fork 10, and is provided with an inwardly bent outer end 19 forming an engaging nib. The engaging nib is adapted to become seated in a notch 20, provided in the head of the fork 11, when the device is used as a rake (Fig. 3). The notch 20 is positioned at the front of the fork head.

The ends of the parallel arms 8 and 9 are preferably rounded on that side at which the spring catch 17 is located, and are provided with a shoulder 21, which shoulder is located in such relation that when the fork 11 is turned to a position at right angles to the ferrule, the edge of the fork head will rest against the shoulder and there be held in position by the nib 19 of the spring catch 17 seating in the notch 20, as shown in Fig. 3.

When the device is used as a fork, as shown in Figs. 1 and 2, it will be seen that the knife arm 13 is folded between the parallel arms 8 and 9 and the cutting edge is covered and protected by the spring catch 17. It will also be observed that the extension or lip 15 rests in the recess 16 and is held therein by the body of the turn button 18.

If it is desired to use the device as a rake and brush knife, it is only necessary to turn the button 18 so that its body does not overlap the extension 15, then turn the fork on the pivot point with the knife projecting upwardly and the fork downwardly. When this is done, the engaging nib 19 of the spring catch 17 will ride over the head of the fork between the inner pair of tines, and when the fork is in a position at approximately right angles to the handle 6, the head of the fork will abut against the shoulder 21 of the ferrule and the nib 19 of the catch will engage in the notch 20 of the head, and thus hold the device in the position shown in Fig. 3 until released by the operator.

When the parts are arranged in the position shown in Figs. 1 and 2, the knife in conjunction with the spring catch closes the slot provided in the ferrule so as to prevent the entrance of foreign matter. The use of the fork puts no strain on the spring, for in this position the spring performs no function except to close that side of the slot of the ferrule which is uppermost.

The locking device for the blade may be constructed in various ways, but the turn button shown seems to afford a very simple means for this purpose.

When using the knife, the handle has to be given a quarter turn from the position shown in Fig. 3, so as to bring the knife substantially parallel with the ground for cutting roots, vines and other things that cannot be acted upon by the tines of the rake. The device when adjusted as shown in Fig. 3 makes an admirable potato digging tool.

Having thus fully described my invention, what I claim as new and desire to secure by Letters Patent, is:—

1. In a tool of the class described, the combination with a handle having a slotted ferrule, a fork having an integral arm extending from the head thereof and pivotally mounted in the slot of the ferrule, said slot receiving the said arm when the fork is arranged in longitudinal alinement with the handle, means for locking the parts in this position, and separate means for locking the parts when the fork and arm are turned at an angle to the handle.

2. A tool of the class described comprising a ferrule, a fork pivotally connected to the ferrule, an arm integral with and extending from the head of the fork, a spring catch adapted to engage the head of the fork to retain the same in one position, and means carried by the ferrule and engaging the arm for retaining the same in another position.

3. A tool of the class described comprising a ferrule bifurcated to form parallel spaced arms, a fork pivotally mounted between the said arms, an arm integral with and extending from the head of said fork and adapted to enter the space between the arms on one side, and a spring catch carried by the ferrule and lying in the space between the arms on the other side of the ferrule and adapted to engage a notch on the said fork and retain the same in one position.

4. A tool of the class described, comprising a tubular ferrule provided with oppositely disposed longitudinal slots opening to the outer end, a double ended tool member pivoted in its medial portion transversely of the walls of the slot to swing to a position in alinement with the ferrule and also at an angle thereto, a clip to lock one end of the tool member in one of the slots in alined position, and a spring bridging the other slot and arranged to engage and lock the tool member in angular position.

5. A tool of the class described comprising a slotted ferrule, a fork pivotally mounted within the slot of said ferrule, a spring catch mounted on the ferrule and extending outwardly along said slot and adapted to engage a notch in said fork to retain the same in one position, an arm extending from the head of the fork and adapted to be received in said slot, a lip on the outer end of said arm, said ferrule having a recess to receive said lip, and a turn button mounted on said ferrule and adapted to retain said lip in said recess when the fork is in another position.

6. In a tool of the class described, the combination with a handle having a hollow ferrule bifurcated to form two parallel spaced arms, a fork having an integral blade arm extending from the head of the fork and pivotally mounted in the slot of the ferrule, said arm being received in said slot when the fork is arranged in longitudinal alinement with the handle, said fork and blade being adapted to be turned so as to be arranged at an angle to the handle, a spring for holding the parts in this adjustment, and a turn button for retaining the blade arm in the slot when in the first-mentioned position.

In testimony, that I claim the foregoing as my own, I have hereto affixed my signature in the presence of two witnesses.

JEREMIAH MILLER.

Witnesses:
JAMES L. LONG,
SIDNEY WHITE.

Copies of this patent may be obtained for five cents each, by addressing the "Commissioner of Patents, Washington, D. C."